3,402,193
PREPARATION OF IMIDO ESTER HYDROCHLORIDES
Hugh J. Hagemeyer, Jr., and William J. Gammans, Longview, Tex., assignors to Eastman Kodak Company, Rochester, N.Y., a corporation of New Jersey
No Drawing. Filed Feb. 16, 1966, Ser. No. 527,736
8 Claims. (Cl. 260—453)

ABSTRACT OF THE DISCLOSURE

A process for preparing imido ester hydrochlorides comprises passing anhydrous hydrogen chloride into a stirred solution of one molar equivalent of a lower alkanol and not less than 1.25 molar equivalents of a nitrile. The imido ester hydrochlorides are well-known and valuable compounds, for example, as chemical intermediates for other valuable chemical compounds such as amidine hydrochlorides.

---

This invention relates to the preparation of amidine hydrochlorides, and the invention is an improvement in the process of preparing imido ester hydrochlorides which are intermediates in the preparation of amidine hydrochlorides.

The classical method of preparing amidine hydrochlorides comprises passing anhydrous hydrogen chloride into an equimolar mixture of a nitrile and a lower alcohol at 0° C. to form an imido ester which is then treated with an alcoholic solution of anhydrous ammonia to give the amidine hydrochloride. Substitution of primary or secondary amines in place of ammonia will yield N-substituted amidines. The first step of this process, i.e., the production of the imido ester hydrochloride, is very slow since little or no agitation of the reactants is possible because of the formation of the solid product. Reaction times for this first step are of the order of 24 hours to seven days. Diluents, such as diethyl ether or dioxane, have been employed in the reaction but with little or no advantage being gained in the time required for reaction.

Accordingly, it is an object of this invention to provide an improved process for preparing imido ester hydrochlorides. Another object of this invention is to provide an improvement in the method of preparing imido ester hydrochlorides by the reaction of a nitrile, a lower alkanol, and hydrogen chloride which greatly reduces the reaction time.

These and other objects are accomplished when a stoichiometric excess of the nitrile is employed in the imido ester synthesis during the classical method of preparing amidine hydrochlorides. The excess nitrile serves as a solvent for the imido ester hydrochloride as it is formed, thereby allowing the use of good agitation and thus, better contact between reactants. We have also discovered that the use of excess nitrile allows higher reaction temperatures to be used without causing undesirable side reactions. In the past, reaction temperatures have had to be maintained at 0° C. or below to minimize the reaction of the imido ester with the particular solvent or alcohol used. The absence of undesirable by-product formation is thus apparent when the solvent consists of excess nitrile reactant. Our invention also has the practical advantage of being readily adaptable to continuous processing.

In the practice of our invention, anhydrous hydrogen chloride is passed into a stirred solution of one molar equivalent of a lower alcohol and not less than about 1.25 molar equivalents of a nitrile. Best results are realized when the mole ratio of nitrile to alcohol is about two to one. Of course, higher ratios can be employed without losing the advantages of our invention although separation of the product and the excess nitrile limit the practicality of doing so. After one equivalent of hydrogen chloride has been added, the solution is stirred at ambient temperatures for 12 to 24 hours or at 35–50° C. for four to eight hours. The solution is again cooled while being neutralized by the addition of a solution of ammonia in absolute alcohol. The resulting mixture is stirred at ambient temperature for about 3 hours and filtered to remove a small amount of ammonium chloride. The filtrate is then vacuum stripped to obtain, as a residue, the crystalline amidine hydrochloride. The distillate from the vacuum stripping operation contains unreacted nitrile and alcohol which can be separated and reused. The imido ester hydrochloride can be isolated prior to the ammonolysis step by the removal of excess nitrile although the reaction time of the ammonolysis step is reduced when it is carried out in the presence of unreacted nitrile.

The aforesaid advantages of our invention can be realized when it is applied to the preparation of the many imido esters and amidines which are known to the prior art, e.g., those disclosed in Wagner and Zook, Synthetic Organic Chemistry (1953) at pages 637 and 638. The nitriles that may be employed in the process as described above can be alkyl, aralkyl, or aryl. Representative nitriles include acetonitrile, butyronitrile, valeronitrile, glutaronitrile, nictononitrile, benzonitrile p-chlorobenzonitrile, p-bromobenzonitrile, o-nitrobenzonitrile, p-nitro-benzonitrile, phenylacetonitrile, p-hydroxyphenylacetonitrile, p-methoxybenzonitrile, N,N'-dimethylbenzonitrile, p-hydroxyphenyl-N-methylacetonitrile, N-phenylbutyronitrile, alpha-naphthonitrile, beta-naphthonitrile, N-phenylbenzonitrile, N,N-diphenylformonitrile, tributylacetonitrile, N-phenyl-N-methylbenzonitrile, N,N-dibutylbenzonitrile, N,N-diphenylbutyronitrile, and N,N-diphenylbenzonitrile. Any lower alkanol is operable in the synthesis of the imido esters, but since the alcohol moiety of the imido ester is split off during the ammonolysis step, lower alkanols having from 1 to about 6 carbon atoms are the most practical. The various primary and secondary amines that can be substituted for ammonia in the ammonolysis step are well known in the art.

The following examples will serve to illustrate the operation and advantages of our invention. In the examples, the word "yield" means the percentage of product obtained of that theoretically obtainable from the quantity of initial reactant consumed.

EXAMPLE 1

A solution of 46.1 grams (1.0 mole) absolute alcohol in 138.2 grams (2.0 moles) anhydrous n-butyronitrile is charged to a one-liter flask fitted with a stirrer, a condenser protected from atmospheric moisture with a calcium chloride drying tube, a thermometer and a gas dispersion tube extending below the liquid level in the flask. 38.3 grams (1.05 mole, 5 mole percent excess) anhydrous hydrogen chloride is passed into the stirred solution while the solution is kept below 0° C. by external cooling. The stirred solution is allowed to warm to ambient temperature and is then slowly heated to 40° C. where it is maintained for 5.0 hours. The solution is cooled to 10° C. or below and the gas introduction tube is replaced by a dropping funnel containing 17.8 grams (1.05 mole) anhydrous ammonia in 100 ml. absolute alcohol. The ammonia solution is then added to the stirred reaction mixture, causing separation of a white solid. The mixture is stirred at ambient temperature for 3.0 hours, filtered to remove ammonium chloride and the residue washed with a small amount of absolute alcohol. The combined filtrate and washings are transferred to a distilling flask where the unreacted nitrile and ethanol are removed at reduced pressure. The residue of n-butyramidine hydrochloride weighed 75 grams. Fractionation of the distillate of ethanol and unreacted nitrile gave 88 grams n-butyronitrile. Thus, the conversion of nitrile to n-butyramidine hydrochloride is 31 percent with a yield of 84 percent.

EXAMPLE 2

The process described in Example 1 was repeated except that during the preparation of the intermediate imido ester hydrochloride, stirring was maintained for 24.0 hours at ambient temperature. 85.0 grams n-butyramidine hydrochloride was obtained and 80 grams butyronitrile was recovered for a conversion of 35 percent and a yield of 83 percent.

EXAMPLE 3

The process described in Example 1 was repeated except that 138.2 grams (2.0 moles) of isobutyronitrile was used in place of the n-butyronitrile. 70 grams isobutyramidine hydrochloride was obtained and 90 grams isobutyronitrile was recovered for a conversion of 28.5 percent and a yield of 81 percent.

Our improved process not only decreases the reaction time required for the formation of imido esters to a fraction of that required in the past, but it also decreases the reaction time of the ammonolysis step. Our invention can therefore be described as an improvement in the process of preparing both imido esters and amidines.

Thet degree of reduction in reaction time permitted by the use of an excess of nitrile in the reaction as compared to the reaction time required by the prior art processes is shown below. The yields are expressed as a percentage of product obtained of that theoretically obtainable from the initial reactants.

| Method | Reaction time | | Over-all yield of n-butyramidine hydrochloride, percent |
|---|---|---|---|
| | Step 1 | Step 2 | |
| A | 5 hr | 3 hr | 61 |
| B | 4 days | 24 hr | 56 |
| C | 4 days | 24 hr | 62 |
| D | 18 hr | | 55 |

Method A shows the reaction time of our improved process as illustrated by Example 1. Method B shows the reaction time that was required when we prepared butyramidine according to the classical method. A mole ratio of nitrile-ethanol-hydrogen chloride of 1:1:1 was used in preparing the imido ester (Step 1) followed by ammonolysis with ethanolic ammonia (Step 2). Method C, as illustrated by Henze et al., J. Am. Chem. Soc., 79, page 2230, is the same as Method B except that absolute ethyl ether was employed as a diluent in the imido ester synthesis. Although a somewhat better over-all yield was obtained, the time required makes this method unattractive for commercial application. Method D is a one-step process which comprises heating a 1:4:20 mole ratio of n-butyronitrile, ammonium chloride, and ammonia in a closed vessel at autogenous pressure. This process not only requires the use of pressure equipment, but also yields a product contaminated with by-product impurities. See Schaefer et al., J. Org. Chem., 27, p. 1225.

From the foregoing, it is apparent that our invention constitutes a major improvement in the preparation of both imido ester hydrochlorides and amidine hydrochlorides. The substantial reduction in reaction time afforded by our invention, without a significant decrease in overall product yield, makes our improved process the one of choice for preparing amidine hydrochlorides.

The invention has been described in detail with particular reference to prefered embodiments thereof, but it will be understood that variations and modifications can be effected within the spirit and scope of the invention described hereinabove and as defined in the appended claims.

We claim:
1. In a process for the preparation of imido ester hydrochlorides by the reaction of a nitrile selected from the group consisting of alkyl, aralkyl and aryl nitriles having from to 2 to 19 carbon atoms, a lower alkanol and hydrogen chloride at a temperature of $-10°$ to $50°$ C., the improvement which consists of using in said reaction an excess of said nitrile of not less than 25% of the stoichiometric amount.

2. A process according to claim 1 in which said excess of said nitrile is not less than 100% of the stoichiometric amount.

3. A process according to claim 2 in which said nitrile is an alkyl nitrile having from 2 to 8 carbon atoms.

4. A process according to claim 2 in which the nitrile is an alkyl nitrile having 4 carbon atoms.

5. Process of claim 1 wherein the reaction mixture is agitated.

6. A process for preparing n-butyrimido ester hydrochlorides consisting of reacting hydrogen chloride, n-butyronitrile, and an alcohol having from 1–6 carbon atoms, in a molar ratio of nitrile to alcohol greater than 1.25:1, at a temperature in the range from $-10°$ C. to $50°$ C.

7. Process of claim 5 wherein the molar ratio of nitrile to alcohol is in the range of 1.25:1 to 2:1.

8. Process of claim 6 wherein the reaction mixture is agitated.

References Cited

The Chemistry of Imidates, Roger et al., Chemical Reviews, volume 61, pp. 179–184.

Synthetic Organic Chemistry, Wagner et al., pp. 634–638.

CHARLES B. PARKER, *Primary Examiner.*

S. T. LAWRENCE III, *Assistant Examiner.*